United States Patent [19]

Kabe et al.

[11] Patent Number: 5,042,545

[45] Date of Patent: Aug. 27, 1991

[54] PNEUMATIC RADIAL TIRE CARCASS LINE PROFILE

[75] Inventors: Kazuyuki Kabe, Tokyo; Ken Takahashi, Atsugi, both of Japan

[73] Assignee: The Yokohama Rubber Co., Ltd., Tokyo, Japan

[21] Appl. No.: 649,288

[22] Filed: Jan. 30, 1991

Related U.S. Application Data

[63] Continuation of Ser. No. 250,282, Sep. 28, 1988, abandoned.

[30] Foreign Application Priority Data

Oct. 5, 1987 [JP] Japan .................................. 62-249703

[51] Int. Cl.⁵ ............................ B60C 3/00; B60C 9/28
[52] U.S. Cl. .................................... 152/454; 152/531; 152/538
[58] Field of Search ............... 152/454, 526, 531, 532, 152/534, 535, 538

[56] References Cited

U.S. PATENT DOCUMENTS

| | | | |
|---|---|---|---|
| 3,292,681 | 12/1966 | Travers | 152/532 |
| 3,677,319 | 7/1972 | Mirtain | 152/531 X |
| 4,282,918 | 8/1981 | Tomoda et al. | 152/454 X |
| 4,669,519 | 6/1987 | Togashi et al. | 152/454 |
| 4,884,610 | 12/1989 | Saito | 152/538 X |

Primary Examiner—Geoffrey L. Knable
Attorney, Agent, or Firm—Armstrong, Nikaido, Marmelstein, Kubovcik, & Murray

[57] ABSTRACT

A pneumatic radial tire comprising a carcass layer, a tread portion and a belt layer disposed therebetween, the belt layer having a structure composed of at least two layers, wherein the belt layer is formed at least at a central portion of the cross section thereof to have a parallel portion substantially parallel to the axis of rotation of the tire over a width corresponding to 30 to 50% of the maximum width of the belt layer; and the carcass layer is formed in such a manner that when the tire is mounted on a rim and filled with air to 10% of a normal internal pressure, a portion corresponding to the parallel portion of the belt layer has a profile of a carcass line joined parallel to the parallel portion and a portion tangentially extending from the edge of the parallel portion and leading through the maximum width portion of the tire to at least the upper edge of a bead filler has a profile of a carcass line comprising arcs having substantially the same radius of curvature.

3 Claims, 5 Drawing Sheets

PNEUMATIC RADIAL TIRE CARCASS LINE PROFILE

BACKGROUND OF THE INVENTION

The present invention relates to a pneumatic radial tire and more particularly to a pneumatic radial tire having improved durability adapted for use in heavy-duty vehicles such as buses or trucks.

The carcass line of a conventional heavy-duty pneumatic radial tire is formed so that the profile in such a state that the tire is mounted on a rim and filled with air corresponding to 10% of a normal internal pressure is approximated by a combination of arcs having a plurality of radii of curvature as shown in FIGS. 4 and 5.

Specifically, the profile of the carcass layer 4 of each of FIGS. 4 and 5 is formed by a combination of a radius of curvature $R_a$ of the crown portion, a radius of curvature $R_c$ of the shoulder portion, and a radius of curvature $R_L$ of the side wall portion 2 and characterized in that the radius of curvature $R_c$ of the shoulder portion is different from the radius of curvature $R_L$ of the side wall portion. Further, the radial tire shown in FIG. 4 satisfies the relationship of $R_c < R_L$, while the radial tire shown in FIG. 5 satisfies the relationship of $R_c > R_L$.

Studies conducted by the present inventors have revealed that the radial tire having the above-described carcass line profile brings about separation in an early stage because either of the edge of the belt layer 6 and the edge of the turnup portion of the carcass layer 4 in the bead portion 3 is weaker than the other and therefore has a short service life on the whole.

Specifically, in such a state that a tire to be filled with air rotates on a ground, when the radius of curvature $R_c$ of the shoulder portion is different from the radius of curvature $R_L$ of the side wall portion, the portion having a larger radius of curvature is more susceptible to the concentration of stress than the portion having a smaller radius of curvature, so that separation occurs. For example, in the case of a tire shown in FIG. 4 satisfying the relationship on the radius of curvature of $R_c < R_L$, the separation occurs in an early stage at the portion having an edge of the turnup portion of the carcass layer 4 in the bead portion 3, while in the case of a tire shown in FIG. 5 satisfying the relationship on the radius of curvature of $R_c > R_L$, the separation occurs in an early stage at the portion having an edge of the belt layer 6. This is because a portion with a large radius of curvature is urged to become large in a change of curvature when a tire deforms by rotation on a ground.

SUMMARY OF THE INVENTION

An object of the present invention is to provide a pneumatic radial tire which can exhibit high durability when applied as a heavy-duty pneumatic radial tire particularly for trucks, buses, etc.

Another object of the present invention is to provide a pneumatic radial tire having improved durability through equalization of the stress in the edge of the belt layer to that in the edge of the turnup portion of the carcass layer to prevent the occurrence of separation in an early stage.

In order to attain the above-described objects, the pneumatic radial tire of the present invention comprises a belt layer having a structure composed of at least two layers provided between a carcass layer and a tread portion. Further, the present invention is characterized in that the above-described belt layer is formed at least in the central portion of the cross section thereof to have a parallel portion substantially parallel to the axis of rotation of a tire over a width corresponding to 30 to 50% of the maximum width of the belt layer, and the above-described carcass layer is formed in such a manner that the carcass line has a profile joined parallel to the above-described parallel portion in a portion corresponding to the parallel portion of the above-described belt layer and a profile comprising arcs having substantially the same radius of curvature in a portion tangentially extending from the edge of the above-described parallel portion and leading through the maximum width portion of the tire to at least the upper edge of the bead filler.

DETAILED DESCRIPTION OF THE PREFERRED EMBODIMENTS

Figure 1:
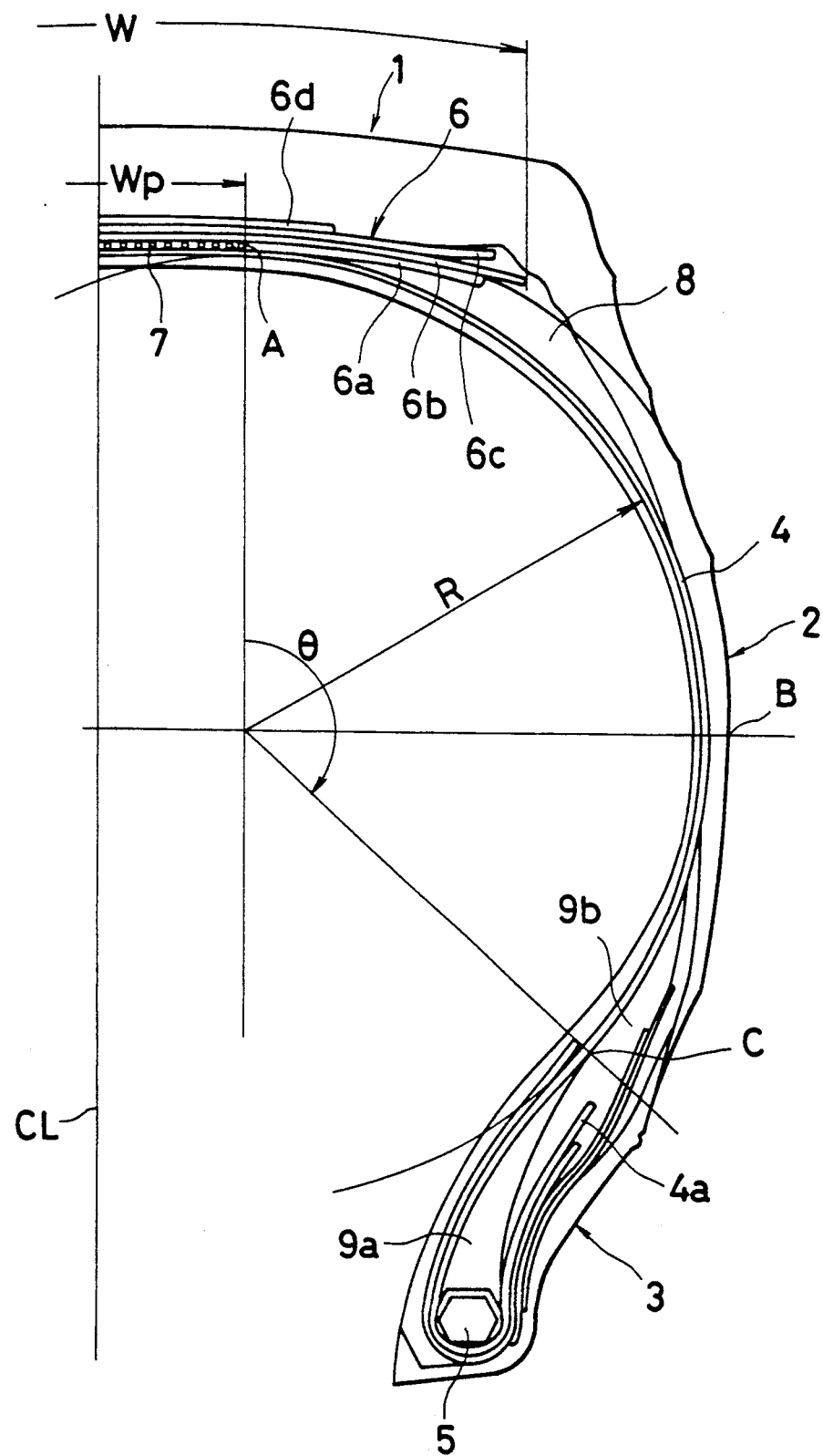
FIG. 1 is a half cross-sectional view of the right half portion from a center line CL passing through an equatorial plane of an example of the radial tire according to the present invention.

In the radial tire of the present invention, the carcass layer comprises steel cords or organic fiber cords, and the cords are provided either in the radial direction of the tire, i.e., at a cord angle of substantially 90° relative to the circumferential direction of the tire, or in the semiradial direction of the tire, i.e., at a cord angle of 90°±10° relative to the circumferential direction of the tire. The carcass layer may have a single-layer structure or a multi-layer structure.

In the radial tire of the present invention, the belt layer comprises a belt structure having at least two tension-resistant layers. The cord angle of the tension-resistant layers is 15° to 30° relative to the circumferential direction of the tire, and the adjacent layers cross each other. In particular, it is preferred that the belt layer of a heavy-duty pneumatic radial tire have a belt structure comprising a reinforcing layer having a single-layer structure disposed between the above-described at least one carcass layer and the above-described at least two tension-resistant layers, i.e., comprising at least three layers. This belt structure serves to prevent uneven wear of the shoulder of the tread and ensure the driving stability through an improvement in the cross-sectional bending rigidity in the radial direction of the tread.

The above-described reinforcing layer has cords of a cord angle of 40° to 75° relative to the circumferential direction of the tire to cross or run parallel with the cords of the tension-resistant layer. Although the cord constituting the above-described belt layers may be any of a steel cord and an organic fiber cord, it is preferred to use a steel cord because of its large reinforcing effect. Further, a combination of a belt layer made of a steel cord with a belt layer made of an organic fiber cord may also be used.

It is necessary that the above-described belt layer provided in the radial tire of the present invention have such a profile that a parallel portion substantially parallel to the axis of rotation of the tire is provided in at least central region in the cross section of the belt layer. Further, it is necessary that the parallel portion have a width corresponding to 30 to 50% of the maximum width of the belt layer.

On the other hand, with respect to the carcass layer provided in the radial tire of the present invention, it is necessary that the carcass line in such a state that the tire is mounted on a rim and filled with air to 10% of a normal internal pressure have a profile joined parallel to the parallel portion of the above-described belt layer in a portion corresponding to the parallel portion of the belt layer and a profile comprising arcs having substantially the same radius of curvature in a portion tangentially extending from the edge of the above-described parallel portion and leading through the maximum width portion of the tire to at least the upper edge of the bead filler.

The expression "profile of the carcass line in such a state that the tire is mounted on a rim and filled with air to 10% of normal internal pressure" used herein is intended to mean the profile of the carcass line in such a state that the profile of the tire has been stabilized by a low internal pressure, more specifically, the profile of the carcass line in such a state that it has passed through a step of filling the tire with air to a normal internal pressure to ascertain that it has been engaged in a rim, a step of decreasing the internal pressure to 10% of the normal internal pressure, and a step of allowing the tire to stand for 24 hr.

The formation of the above-described parallel portion in the central region of the belt layer enables the carcass line corresponding to the parallel portion to be kept parallel to the axis of rotation of the tire. Keeping the central portion of the carcass line parallel to the axis of rotation of the tire in turn enables the carcass line of the shoulder region and that of the side wall region to be held in the form of arcs having the same radius of curvature. When the carcass line is kept in the above-described arcuated form, the tension of the carcass cord is uniformly distributed over the full length from the shoulder region to the bead region, which enables the attainment of the object of the present invention, i.e., enables an improvement in the durability of the whole tire through suppression of the separation in both the edge region of the belt layer and the edge region of the turnup portion of the carcass layer.

In the case of a heavy-duty radial tire, the above-described function and effect of preventing the separation can further be improved by inserting a rubber filler between the carcass layer separating tangentially from the edge of the parallel portion of the above-described carcass line central region and the above-described belt layer. The rubber filler is preferably one having a 200% modulus of 40 to 80 kg/cm$^2$, preferably 50 to 70 kg/cm$^2$.

The studies conducted by the present inventors have revealed that the insertion of the rubber filler enables the share of the internal pressure with respect to the belt layer to be substantially reduced in determining the carcass line for sharing the internal pressure of the tire.

In an extreme case, no problem occurs in determining the carcass line even when the share of the internal pressure with respect to the belt layer in the portion containing a rubber filler inserted therein is substantially null. The above-described reduction in the share of the internal pressure on both edges of the belt layer can further be improved by providing the central portion of the belt layer with a portion exhibiting tension increasing towards the circumferential direction of the tire, i.e., the above-described parallel portion parallel to the axis of rotation of the tire. Further, as described above, the tension of the whole carcass cord with respect to the internal pressure can uniformly be distributed by providing a carcass line comprising arcs having substantially the same radius of curvature in a portion tangentially extending from the edge of the above-described parallel portion and leading through the maximum width portion of the tire to at least the upper portion of the bead filler.

In the present invention, the expression "a carcass line comprising arcs having substantially the same radius of curvature" does not necessarily mean that all the arcs have the same radius of curvature but includes cases where the radius of curvature partially varies in a range of ±2.0 mm, preferably ±1.0 mm.

Further, in the case of a heavy-duty pneumatic radial tire, it is preferred that the belt structure of the above-described reinforcing layer be such that the central region is divided into left and right portions over the same width as that of the above-described parallel portion, i.e., over 30 to 50% of the maximum width of the belt layer, to form a split structure and a belt layer (a tension-resistant auxiliary layer) having a cord angle of 0° to 10° relative to the circumferential direction of the tire is provided in the split region. In the case of a tire for a relatively light vehicle but not a heavy-duty tire, it is possible to provide only the belt layer having a small cord angle without providing the belt layer split into the left and right portions.

As described above, the belt layer having a small cord angle is provided so as to have a cord angle of 0° to 10°. However, the smaller the cord angle, the better the results. For this reason, the cord angle is more preferably 0° to 5°, most preferably 0°. The cord for use in the belt layer having a small cord angle may be any of an organic fiber cord and a steel cord. However, it is preferred that the cord be made of an organic fiber, such as nylon, polyester, aramid fiber or rayon, because they can thermally shrink before vulcanization.

A combination of the split structure of the first belt layer adjacent to the carcass layer with the provision of the belt layer having a small cord angle in the split portion brings about not only an improvement in the durability with respect to the travelling on a rough road having remarkable unevennesses but also an effect of improving the belt durability with respect to the travelling on an ordinary pavement at a high speed. That is, the split structure of the first belt layer brings about a lowering in the cross-sectional flexural rigidity in the radial direction of the tire in the central region of the tread portion. This relaxes the concentration of stress when the tire stamps an unevenness, such as stone, during travelling on a rough road, which renders the tread portion less susceptible to damage.

Mere formation of a split structure in the belt layer brings about a lowering in the reinforcing effect of the belt layer in the central portion of the tread, so that the central region of the tread is outwardly grown and deformed by an inflation force of an internal pressure when travelled on an ordinary pavement at a high speed. This finally causes separation at the edge of the belt layer. However, when the above-described belt layer having a small cord angle is disposed in the split central region, the hoop effect of this belt layer prevents the central region of the tread portion from outwardly growing and deforming during travelling at a high speed. That is, an improvement in the belt durability during travelling on a pavement at a high speed can be attained.

The present invention will now be described in detail with reference to examples shown in the drawings.

In FIG. 1, numeral 1 designates a tread portion, numeral 2 a sidewall portion, and numeral 3 a bead portion. Numeral 4 designates a carcass layer comprising a steel cord or an organic fiber cord, and the edge portion of the carcass layer is wound up from the inside of a bead 5 towards the outside thereof to form a turnup portion $4_a$. Bead fillers $9_1$ and $9_b$ are interposed between the turnup portion $4_a$ and the carcass layer 4.

In the tread portion 1, a belt layer 6 is disposed on the carcass layer 4. In this example, the belt layer 6 has a four-layer structure, i.e., comprises belt layers $6_a$, $6_b$, $6_c$ and $6_d$. Among them, the belt layers $6_b$, $6_c$ and $6_d$ each serve as a tension-resistant layer and have a cord angle of 15° to 30° relative to the circumferential direction of the tire. Further, the belt layers $6_b$ and $6_c$ are provided so as to cross each other, while the belt layers $6_c$ and $6_d$ are provided in the same direction. The first belt layer $6_a$ provided on and adjacent to the carcass layer 4 serves as a reinforcing layer, has a cord angle of 40° to 75° relative to the circumferential direction of the tire, and further has a split structure wherein the central region is split by a width of $W_p$. In this example, a belt layer 7 made of a nylon fiber cord and having a cord angle of 0° relative to the circumferential direction of the tire is provided in the split portion.

Figure 2:
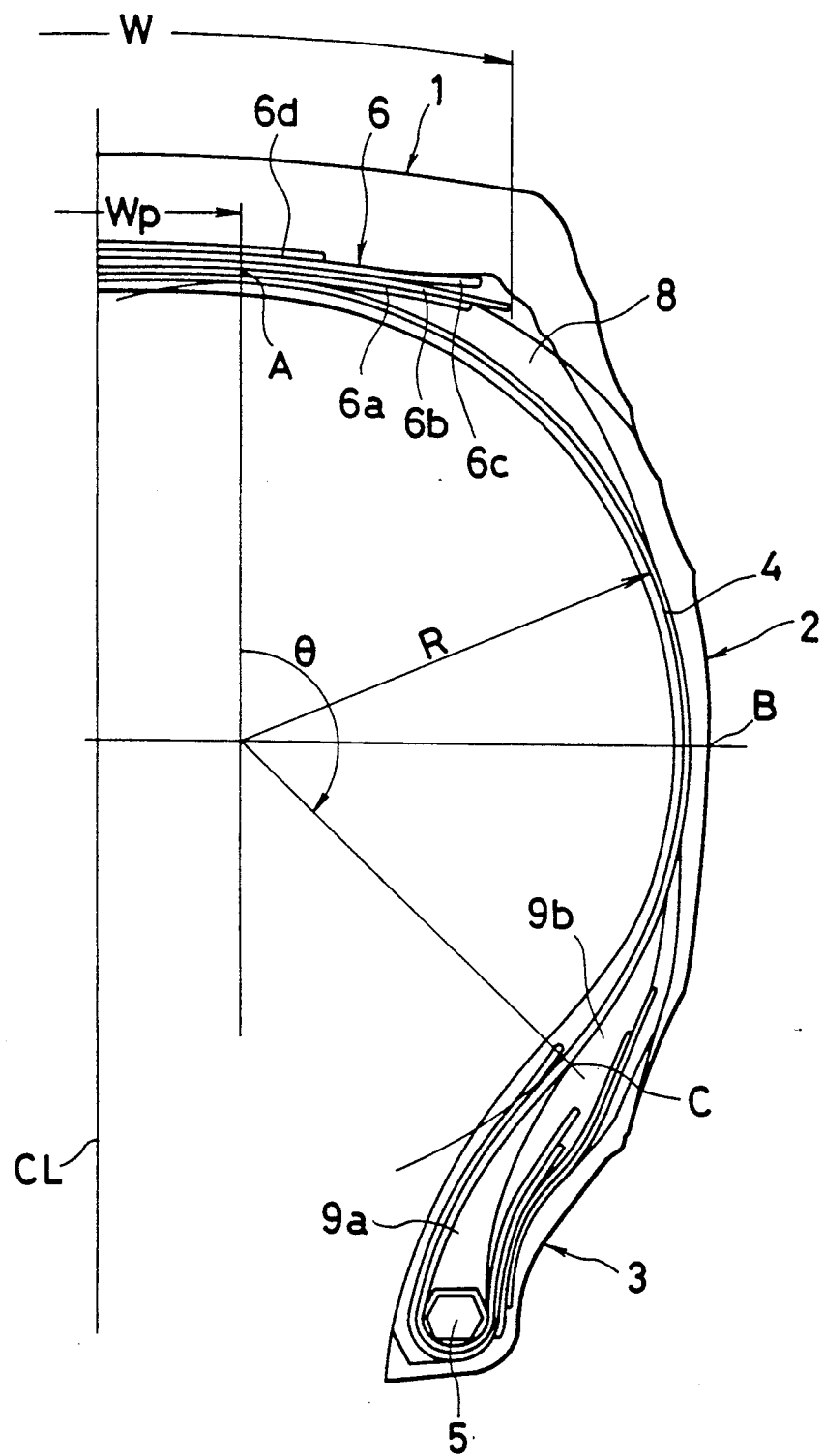
FIG. 2 is a half cross-sectional view of the right half portion from a center line CL passing through an equatorial plane of another example of the radial tire according to the present invention.
Figure 3:
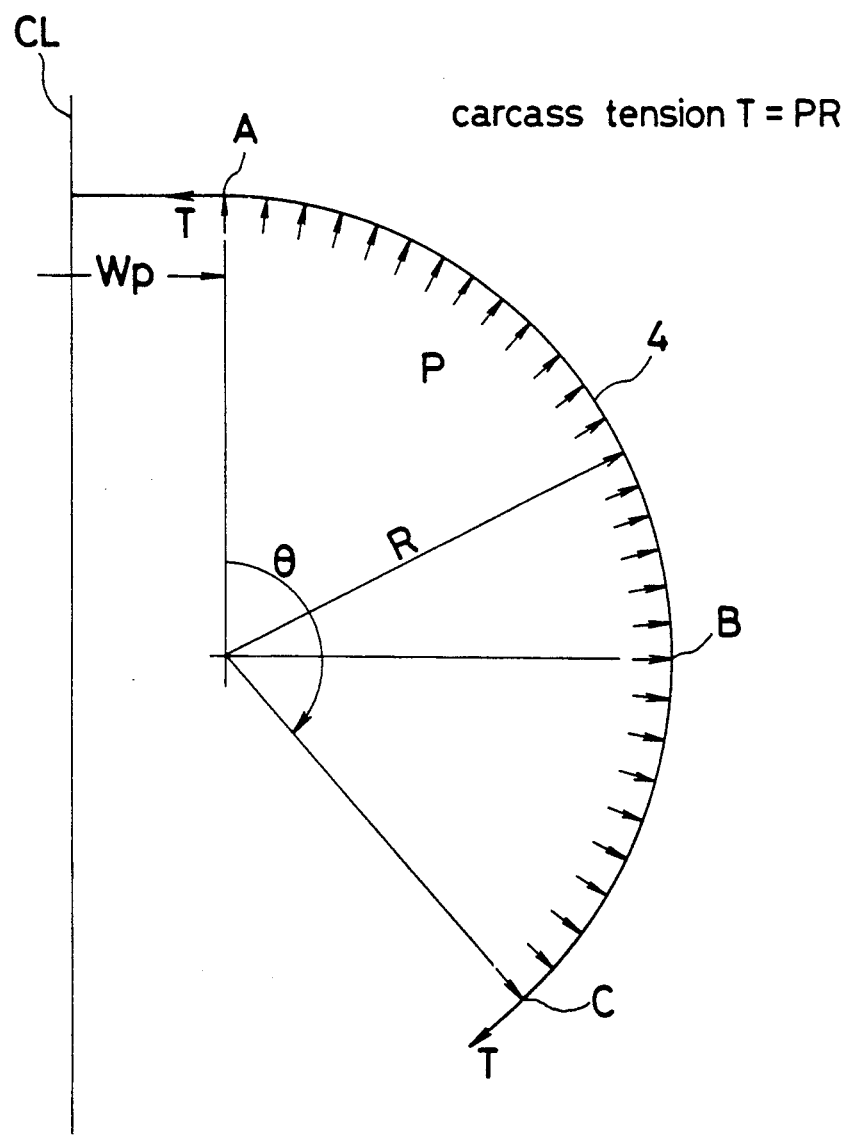
FIG. 3 is a diagram showing the relationship between the internal pressure P and the carcass tension T in a major portion of the carcass line of the radial tire of the present invention.

The belt layer 7 has a profile substantially parallel to the axis of rotation of the tire, and the width thereof $W_p$ is 30 to 50% of the maximum width W of the belt layer. The carcass layer 4 is joined parallel to the above-described parallel portion, i.e., belt layer 7, tangentially extends from the edge A and leads through the maximum width portion B of the tire to the bead 5. The carcass line of the carcass layer 4 from edge A of the belt layer 7 to the upper edge C of the lower bead filler $9_a$ comprises arcs having substantially the same radius R of curvature over an angular extent $\theta$ as shown by FIGS. 1–3. A rubber filler 8 having a 200% modulus of 40 to 80 kg/cm² is interposed between the carcass layer 4 and the belt layer 6.

FIG. 2 is a cross-sectional view of another example of the heavy-duty radial tire according to the present invention. This example is substantially the same as the above-described example, except that the structure of the belt layer is different from that of the above-described example. Specifically, in the belt layer 6 of this example, the first belt layer $6_1$ is formed so that the central portion will be parallel to the axis of rotation of the tire over a width of $W_p$ corresponding to 30 to 50% of the maximum width, W, of the belt layer without forming a split structure.

In the radial tires of the above-described examples, the formation of a parallel portion having a width of $W_p$ in the central portion of the belt layer enables the carcass line in the parallel portion to be kept parallel to the axis of rotation of the tire, which makes it possible to keep the carcass line of the shoulder region and that of sidewall region in the form of arcs having substantially the same radius of curvature R. In the carcass line comprising arcs having substantially the same radius R of curvature, the relation of the carcass cord tension T to the internal pressure P in the arc region is represented by the formula T = PR as shown in FIG. 3. That is, the carcass cord tension is uniformly distributed over the whole length. Therefore, the stress in the edge of the belt layer and the stress of the edge of the turnup portion of the carcass layer are equalized to each other, which prevents the occurrence of the separation in an early stage in either of the two portions.

EXAMPLE

Figure 4:
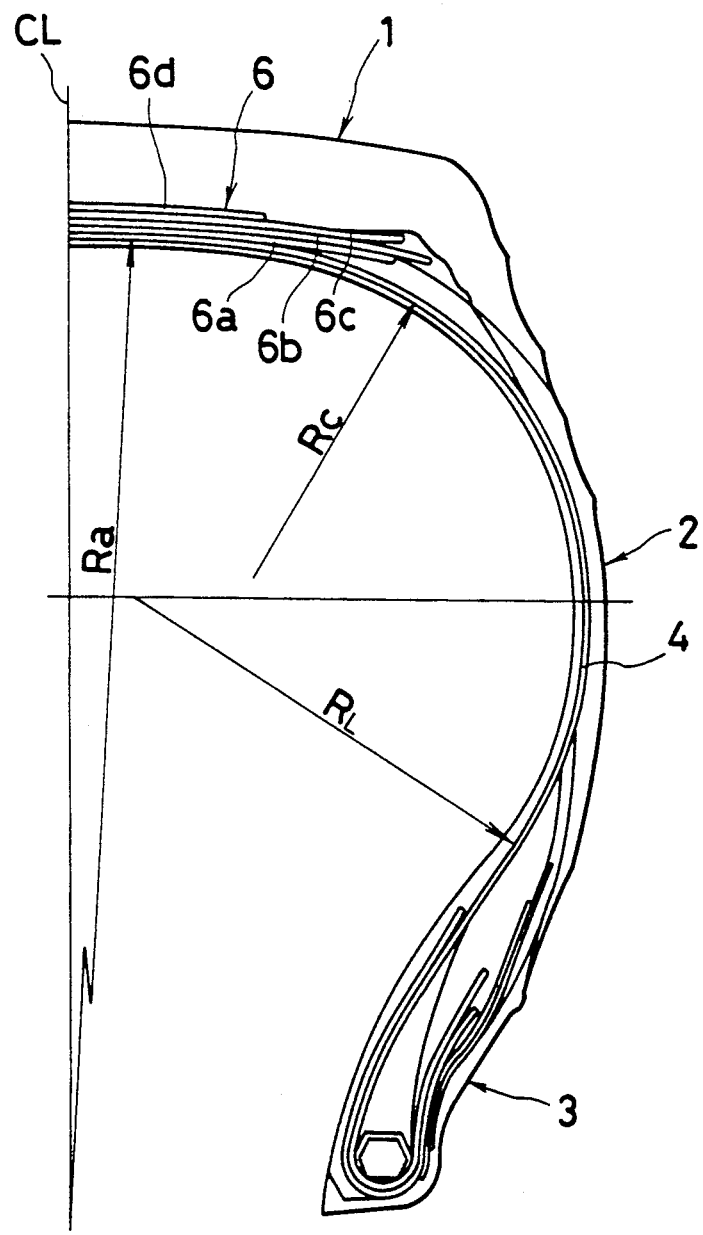
FIGS. 4 and 5 are respectively half cross-sectional views of the right half portion from a center line CL passing through an equatorial plane of conventional tires.
Figure 5:
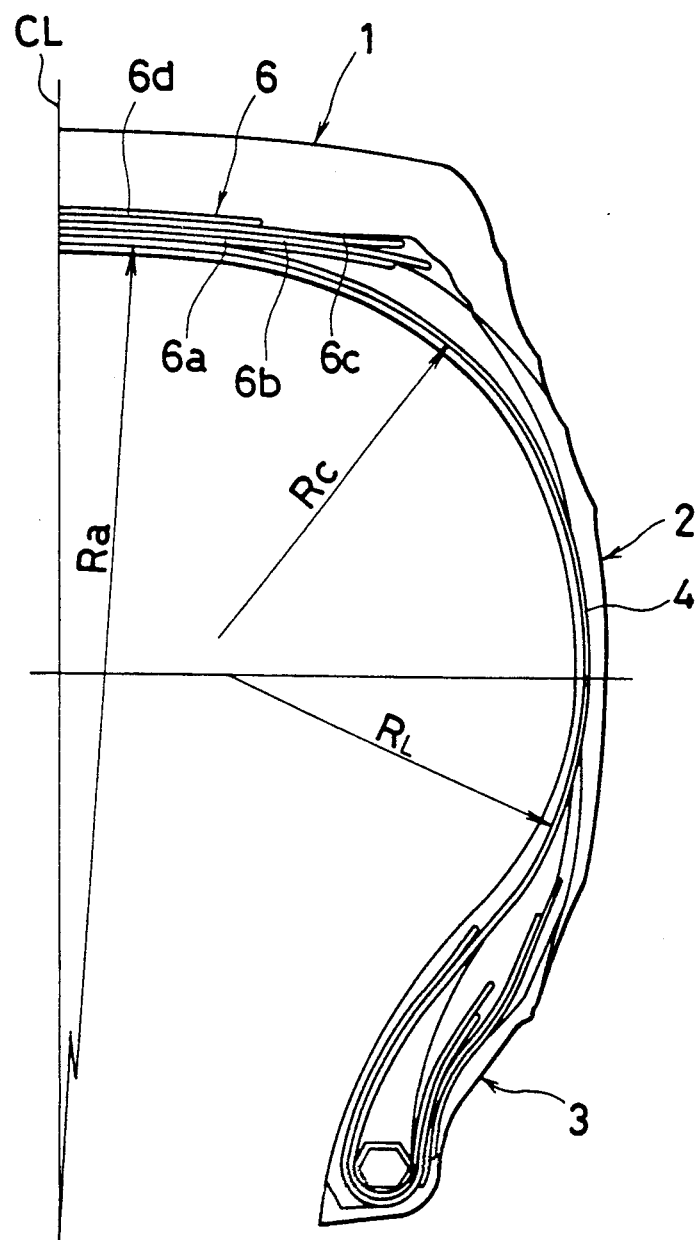

Tire A of the present invention having a structure shown in FIG. 1, tire B of the present invention having a structure shown in FIG. 2, conventional tire C having a structure shown in FIG. 4, and conventional tire D having a structure shown in FIG. 5 each of which has a tire size of 1000R20 were manufactured under the following conditions.

(1) Tire A of the present invention belt structure:
    belt layer $6_a$: steel cord (cord angle = 60° in both left and right belts)
    belt layer 7: nylon cord (cord angle = 0°)
    belt layer $6_b$: steel cord (cord angle = 20°)
    belt layer $6_c$: steel cord (cord angle = −20°)
    belt layer $6_d$: steel cord (cord angle = −20°)
    width $W_p$ of belt layer 7 = 64 mm
carcass line:
    the portion corresponding to the belt layer 7 is substantially parallel to the axis of rotation of the tire.
    radius R of curvature = 101 mm (2) Tire B of the present invention belt structure:
    belt layer $6_a$: steel cord (cord angle = 60°)
    belt layer $6_b$: steel cord (cord angle = 20°)
    belt layer $6_c$: steel cord (cord angle = −20°)
    belt layer $6_d$: steel cord (cord angle = −20°)
    maximum width W of belt layer = 170 mm
    width $W_p$ of parallel portion = 64 mm
carcass line:
same as that of tire A of the present invention.

(3) Conventional tire C:

belt structure:
    belt layer $6_a$: steel cord (cord angle = 60°)
    belt layer $6_b$: steel cord (cord angle = 20°)
    belt layer $6_c$: steel cord (cord angle = −20°)
    belt layer $6_d$: steel cord (cord angle = −20°)
carcass line:
    radius $R_a$ of curvature of crown portion = 360 mm
    radius $R_c$ of curvature of shoulder portion = 80 mm
    radius $R_L$ of curvature of sidewall portion = 114 mm (4) Conventional tire D belt structure:
    belt layer $6_a$: steel cord (cord angle = 60°)
    belt layer $6_b$: steel cord (cord angle = 20°)
    belt layer $6_c$: steel cord (cord angle = −20°)
    belt layer $6_d$: steel cord (cord angle = −20°)
carcass line:

radius $R_a$ of curvature of crown portion = 320 mm
radius $R_c$ of curvature of shoulder portion = 95 mm
radius $R_L$ of curvature of sidewall portion = 89 mm The above-described four types of radial tires were subjected to the following durability evaluation test-1 and durability evaluation test-2. The results are shown in the following table.

Durability evaluation test-1

This test is a durability evaluation test on the edge portion of the belt layer and conducted by the following slalom test with an indoor drum tester:
 rim: 7.50 V×20
 internal pressure: 7.25 kgf/cm²
 speed: 45 km/hr
A load was stepwise increased from 2700 kg every 20 hr at an increment of 5% with slip angle variation by means of a sine wave to determine the number of steps required for causing separation of the edge of the belt layer.

The larger the number of steps, the better the durability.

Durability evaluation test-2

This test is a durability evaluation test on the bead portion and conducted by means of an indoor drum tester.
 rim: 7.50 V×20
 internal pressure: 9.00 kgf/cm²
 speed: 20 km/hr
Load variation was applied to the tire by means of a sine wave of a load of 4500±1500 kg to determine the time taken for causing separation of the bead portion.

The longer the travelling time, the better the durability.

| durability evaluation test | test-1 | test-2 |
| --- | --- | --- |
| tire A of the present invention | 16 steps | no separation till 1000 hr |
| tire B of the present invention | 11 steps | no separation till 1000 hr |
| conventional tire C | 11 steps | separation observed 580 hr |
| conventional tire D | 9 steps | no separation till 1000 hr |

It is apparent from the above table that tires A and B of the present invention exhibit better durability in both the edge of the belt layer and the bead portion than that of conventional tires C and D.

As described above, the radial tire of the present invention is characterized in that a parallel portion substantially parallel to the axis of rotation of the tire over a width corresponding to 30 to 50% of the maximum width of the belt layer is provided in at least central portion of the cross section of the belt layer, the carcass line in the parallel portion of the belt layer has a profile joined parallel to the parallel portion, and the carcass line tangentially extending from the edge of the parallel portion and leading through the maximum width portion of the tire to at least the upper edge of the bead filler comprises arcs having substantially the same radius of curvature. The above-described features of the present invention enables the prevention of occurrence of separation in an early stage through equalization of the stress in the edge of the belt layer to the stress in the edge of the turnup portion of the carcass layer, which contributes to an improvement in the durability of the tire.

We claim:

1. A pneumatic radial tire for heavy-duty vehicle use comprising: a carcass layer, a tread portion, a belt layer disposed between said carcass layer and said tread portion, and a rubber filler inserted between a shoulder region of said belt layer and said carcass layers, said belt layer having a structure composed of at least three layers, wherein said belt layer is formed in a central region of the cross section thereof to have a parallel portion substantially parallel to the axis of rotation of the tire over a width corresponding to 30 to 50% of the maximum width of said belt layer;

said belt layer includes a layer adjacent to said carcass layer comprised of a combination of layer having a cord angle of substantially 0° relative to the circumferential direction of the tire disposed in the central region in a width corresponding to 30 to 50% of the maximum width of said belt layer, with layers having a cord angle of 40° to 75° relative to the circumferential direction of the tire respectively provided on left and right edge portions of said belt layer; and said carcass layer is formed in such a manner that when the tire is mounted on a rim and filled with air to 10% of a normal internal pressure, a portion of said carcass layer corresponding to the parallel portion of said belt layer has a carcass line profile parallel to said parallel portion of said belt layer, and a portion of said carcass layer tangentially extending from the edge of said parallel portion and leading through the maximum width portion of the tire to at least the upper edge of a bead filler has a carcass line profile comprising arcs having substantially the same radius of curvature.

2. A pneumatic tire according to claim 1, wherein said bead filler is a lower bead filler provided directly on a bead, an edge portion of said carcass layer is wrapped from an inside to an outside of said bead to form a turnup portion of said carcass layer and an upper edge of said turnup portion of the carcass layer is located close to an upper edge of said lower bead filler.

3. A pneumatic tire according to claim 1, wherein said rubber filler has a 200% modulus of 40 to 80 kg/cm².

* * * * *